(12) United States Patent
Stamenkovic (10) Patent No.: US 10,101,151 B2
(45) Date of Patent: Oct. 16, 2018

(54) DEVICE AND METHOD FOR MEASURING MEASUREMENT OBJECTS

(71) Applicant: Stotz Feinmesstechnik GmbH, Gerlingen (DE)

(72) Inventor: Milan Stamenkovic, Stuttgart (DE)

(73) Assignee: STOTZ FEINMESSTECHNIK GMBH, Gerlingen (DE)

( * ) Notice: Subject to any disclaimer, the term of this patent is extended or adjusted under 35 U.S.C. 154(b) by 157 days.

(21) Appl. No.: 15/106,505

(22) PCT Filed: Sep. 8, 2014

(86) PCT No.: PCT/EP2014/069024
§ 371 (c)(1),
(2) Date: Jun. 20, 2016

(87) PCT Pub. No.: WO2015/090651
PCT Pub. Date: Jun. 25, 2015

(65) Prior Publication Data
US 2017/0003124 A1    Jan. 5, 2017

(30) Foreign Application Priority Data

Dec. 20, 2013 (DE) .......................... 10 2013 114 667
Feb. 21, 2014 (DE) .......................... 10 2014 102 261

(51) Int. Cl.
*G01B 13/10* (2006.01)
*G01B 21/14* (2006.01)
(Continued)

(52) U.S. Cl.
CPC ............... *G01B 21/14* (2013.01); *G01B 7/13* (2013.01); *G01B 13/10* (2013.01); *G01B 21/20* (2013.01)

(58) Field of Classification Search
CPC ........ G01B 21/14; G01B 21/20; G01B 13/10; G01B 13/16; G01B 5/201; G01B 7/282
(Continued)

(56) References Cited

U.S. PATENT DOCUMENTS 3,028,676 A * 4/1962 Lauri .................. G01B 5/06
33/542
3,604,248 A * 9/1971 Altmann ................ G01M 1/22
33/550
(Continued)

FOREIGN PATENT DOCUMENTS

DE   102010014817 A1   10/2011
EP      2378242 A2     10/2011

OTHER PUBLICATIONS

Corresponding EPO Office Action; International Application No. 14759212.5-1022; Intellectual Publication Date: Sep. 21, 2016; dated Feb. 1, 2018; 7 pages.

*Primary Examiner* — Christopher Fulton
(74) *Attorney, Agent, or Firm* — Cantor Colburn LLP (57) ABSTRACT

The invention relates to a device for industrially measuring measurement objects with a measuring probe that can be led up to the measurement object, on which measuring probe at least one distance sensor is provided for measuring instantaneous distance of a reference point of the measuring probe from a wall of the measurement. The measuring probe is rotatably supported on a retainer, which is fixed in relation to the measurement object and/or the position of which in relation to the measurement object is known. The device also include an evaluating apparatus designed to receive at least one distance value determined by the distance sensor and to associate the at least one distance value with a rotational position of the measuring probe in the context of a measurement. Means are provided for determining a (Continued)

change in the relative position between the retainer and the measurement object occurring during the measurement.

19 Claims, 5 Drawing Sheets

(51) Int. Cl.
*G01B 7/13* (2006.01)
*G01B 21/20* (2006.01)

(58) Field of Classification Search
USPC ........ 33/542, 543, 544.1, 544.5, 544.6, 550, 33/DIG. 8
See application file for complete search history.

(56) References Cited

U.S. PATENT DOCUMENTS

| | | | | |
|---|---|---|---|---|
| 3,823,484 | A * | 7/1974 | Dunn | G01B 5/12 33/520 |
| 4,112,355 | A * | 9/1978 | Gibson, Jr. | G01R 27/00 324/606 |
| 4,412,385 | A * | 11/1983 | Selleri | G01B 7/13 33/520 |
| 4,872,269 | A * | 10/1989 | Sattmann | G01B 7/13 33/542 |
| 4,888,877 | A * | 12/1989 | Enderle | G01B 5/012 33/503 |
| 5,205,047 | A * | 4/1993 | Danielli | G01B 7/13 33/542 |
| 6,243,962 | B1 * | 6/2001 | Brock | B23B 29/02 33/542 |
| 8,770,051 | B2 * | 7/2014 | Stamenkovic | G01B 13/10 33/543 |
| 2007/0153296 | A1 | 7/2007 | Schick | |
| 2010/0149524 | A1 | 6/2010 | Mayer et al. | |
| 2011/0088273 | A1 * | 4/2011 | Yamamoto | G01B 3/008 33/561 |
| 2011/0107611 | A1 | 5/2011 | Desforges et al. | |
| 2011/0247409 | A1 * | 10/2011 | Stamenkovic | G01B 7/13 73/152.54 |
| 2011/0270562 | A1 | 11/2011 | Nippon et al. | |

\* cited by examiner

DEVICE AND METHOD FOR MEASURING MEASUREMENT OBJECTS

CROSS-REFERENCES TO RELATED APPLICATIONS

This patent application is a 371 of International Application No. PCT/EP2014/069024, filed Sep. 8, 2014 which claims the priority of German Application No. 102014102261.0, filed Feb. 21, 2014and of German Application No. 102013114667.8, filed Dec. 20, 2013, each of which are incorporated herein by reference in their entirety.

The present invention relates to an apparatus for the industrial measurement of measurement objects such as workpieces having a measuring probe which can be led up to the measurement object and at which at least one distance sensor is provided with which the instantaneous distance of a reference point of the measuring probe from a wall of the measurement object can be determined, with the measuring probe being rotatably supported at a holder. The holder can be fixed with respect to the measurement object. It is, however, generally sufficient for the carrying out of a measurement if the position of the holder relative to the measurement object is known. An evaluation device of the apparatus is configured to receive at least one distance value determined by the distance sensor as part of a measurement and to associate it with a rotary position of the measuring probe. The evaluation device of the apparatus can specifically be configured to receive a number of consecutively determined distance values or distance data in the course of a rotation of the measuring probe.

Such apparatus serve in many areas of industrial metrology to check workpieces with respect to their shape accuracy. A specific area of application is the checking of the shape accuracy of cylinder bores in engine blocks of internal combustion engines. The distance sensor can in particular be a pneumatic measuring nozzle since pneumatic measuring nozzles allow reliable distance determinations even under rough conditions. The measuring probe is preferably supported at the holder with tilt variability, wherein means are provided for determining the tilt and for compensating the measuring probe's own movements and incorrect positions with reference to the determined tilt. Measurement apparatus of the initially named kind are disclosed, for example, in DE 10 2010 014 817 A1.

In form honing, cylinder bores in an engine block are not produced with the desired ideal shape, but rather with an inverse warp geometry so that the bores only adopt the ideal shape due to the corresponding warping after installation and after an operation-induced heating of the engine block. It is accordingly important in connection with form honing not only to check the roundness or the roundness deviation of a bore, but also to determine its complete shape extent or shape course as fast, as exactly and as reliably as possible.

The term "bore" here and in the following stands for recesses or cut-outs of any shape introduced into a measurement object. In many areas of technology, the object is faced of determining the three-dimensional shape extent of bores even if their shape deviates by a relatively large amount from a cylinder shape.

Apparatus of the initially named kind are also used for carrying out external measurements, for example for determining the shape extent of the surface of shaft-like, spindle-like or piston-like workpieces. Whereas a measuring probe designed as a measuring rod is preferably provided for the measurement of bores, a measuring ring can in particular be provided as the measuring probe for carrying out external measurements.

It is necessary so that the measuring probe can be positioned at a desired position in the environment of the measurement object to attach the holder with the measuring probe to an adjustable carrier which can e.g. be associated with a linear guide system or with a 3D positioning device. This carrier can be anchored, i.e. "grounded", at a base frame of the associated test device. The measurement object, that is e.g. the engine block with the bores to be measured, is also typically fixed with respect to a base frame of the test device.

It has been found in practice that changes in the relative position between the carrier and the measurement object, and thus between the holder of the measuring probe and the measurement object, can occur during the measurement of a measurement object. Such positional changes inevitably falsify the measurement result.

It is an object of the invention to make possible a fast, exact and reliable measurement of the shape extent of measurement objects of any desired shape.

The object is satisfied by an apparatus having the features described herein.

In accordance with the invention, means are provided for determining any change in the relative position between the holder and the measurement object which occur during a measurement. The evaluation device can additionally be configured to carry out a correction of the measurement with reference to the determined positional change in the sense that movements of the holder and/or of the measurement object such as vibrations are "removed by calculation". The invention is inter alia based on the recognition that it is not absolutely necessary to determine the absolute position of the holder or of the associated carrier continuously. It is rather sufficient only to determine deviations or changes in the position of the holder which occur during a measurement. Such positional changes can be detected relatively easily metrologically, for example by means of acceleration sensors.

The evaluation device is preferably configured to carry out a correction of the measurement with reference to the determined change in the relative position between the holder and the measurement object, with the carrying out of the correction in particular comprising a compensation of movements of the holder and/or of the measurement object. Unwanted influences on the measurement by movements of the holder and of the measurement object are thus avoided.

The means for determining a change in the relative position between the holder and the measurement object occurring during the measurement can comprise at least one acceleration sensor attached to the holder or to a carrier component connected thereto in a fixed position. This allows a simple and reliable determination of movements of the holder and of the measurement object.

An embodiment of the invention provides that at least one pair of acceleration sensors is attached to the holder or to the carrier component, said pair comprising two acceleration sensors arranged in a common plane and offset from one another with respect to a rotational axis of the measuring probe by an angle of rotation, preferably by 90°, with at least two such pairs in particular being attached to the holder or to the carrier component and being spaced apart from one another in the direction of the axis of rotation. A two-dimensional movement of the holder or of the carrier component in the respective plane can be determined by such a pair of rotationally offset acceleration sensors.

In accordance with a special aspect of the invention, the or each acceleration sensor is configured and arranged for detecting the acceleration of the holder or of the carrier component in a radial direction with respect to the axis of rotation. The use of one-dimensional acceleration sensors is particularly inexpensive.

The means for determining a change in the relative position between the holder and the measurement object occurring during the measurement can furthermore comprise at least one acceleration sensor attached to the measurement object. An acceleration sensor attached to the measurement object can determine movements of the measurement object and can thus increase the measurement accuracy of the measurement apparatus. The fastening of the acceleration sensor to the measurement object can take place by means of a vacuum suction device, for example.

Provision can be made that the or each acceleration sensor is configured as a three-dimensional sensor to further increase the reliability of the measurement.

The evaluation device can be configured to integrate an acceleration value received from the acceleration sensor twice and optionally to determine respective integration constants. The first integration in this respect produces a speed value, while the second integration produces a value for the path covered. The integration constants can be determined using boundary conditions. The acceleration values detected by sensors can thus be converted into position changes of the holder, of the carrier component or of the measurement object.

It is generally of advantage to select the number of acceleration sensors used as just large enough that a path determination by a two-fold integration is unambiguous. A single three-dimensional sensor which is attached to a rigid body and which has a corresponding performance capability can e.g. be sufficient for such an unambiguous determination capability. It is preferred for cost reasons only to use as many sensors as necessary.

A further embodiment of the invention provides that the means for determining a relative position between the holder and the measurement object occurring during the measurement comprise at least one carrier element, in particular a rod, separate from the holder and in a fixed position with respect to the measurement object, wherein at least one tilt sensor for determining a tilt of the carrier element as well as at least one distance sensor for detecting a distance of the carrier element from the holder, from a carrier component connected thereto in a fixed position and/or from the measurement element are attached to the carrier element. Such an arrangement can form a position determination device for the additional separate determination of the positional change of the holder or of the carrier component relative to the measurement object. The measurement accuracy can in this respect be increased by redundancy. In principle, a position determination device such as described above can also be provided for the autonomous determination of positional changes, with further sensors being dispensed with.

At least two, preferably at least three, tilt sensors, arranged spaced apart from one another and/or at least two, preferably at least three, distance sensors, arranged spaced apart from one another can be attached to the carrier element to ensure sufficient measurement accuracy.

Furthermore, at least one further carrier element can be provided having at least one tilt sensor and at least one distance sensor, said carrier element being arranged offset by an angle of rotation, preferably by 90°, from the other carrier element with respect to an axis of rotation of the measuring probe. The two-dimensional position of the holder, of the carrier component or of the measurement object in the respective plane can be determined by the rotationally offset distance measurement.

The evaluation device can be configured to receive a set of consecutively determined distance values or distance data in the course of a rotation of the measuring probe. This makes it possible not only to determine the roundness or the roundness deviation of a measurement object, but also its exact shape. The determined distance values can be used to prepare a graphically presentable grid of the measurement object in order thus to allow a visualization of the shape or of the shape deviations of the measurement object.

The invention also relates to a method for the industrial measurement of measurement objects in which the measuring probe is led up to a measurement object, measurements are carried out repeatedly or continuously by means of the at least one distance sensor and the changes in the relative position between the holder and the measurement object occurring during the carrying out of the measurements are determined.

It is preferred that a correction of the measurement is carried out with reference to the determined change in the relative position between the holder and the measurement object, with movements of the holder and/or of the measurement object in particular being compensated to carry out the correction. A particularly accurate measurement is hereby made possible.

Further embodiments of the invention are also set forth in the dependent claims, in the description and in the drawing.

The invention will be described in the following by way of example with reference to the drawings.

Figure 1:
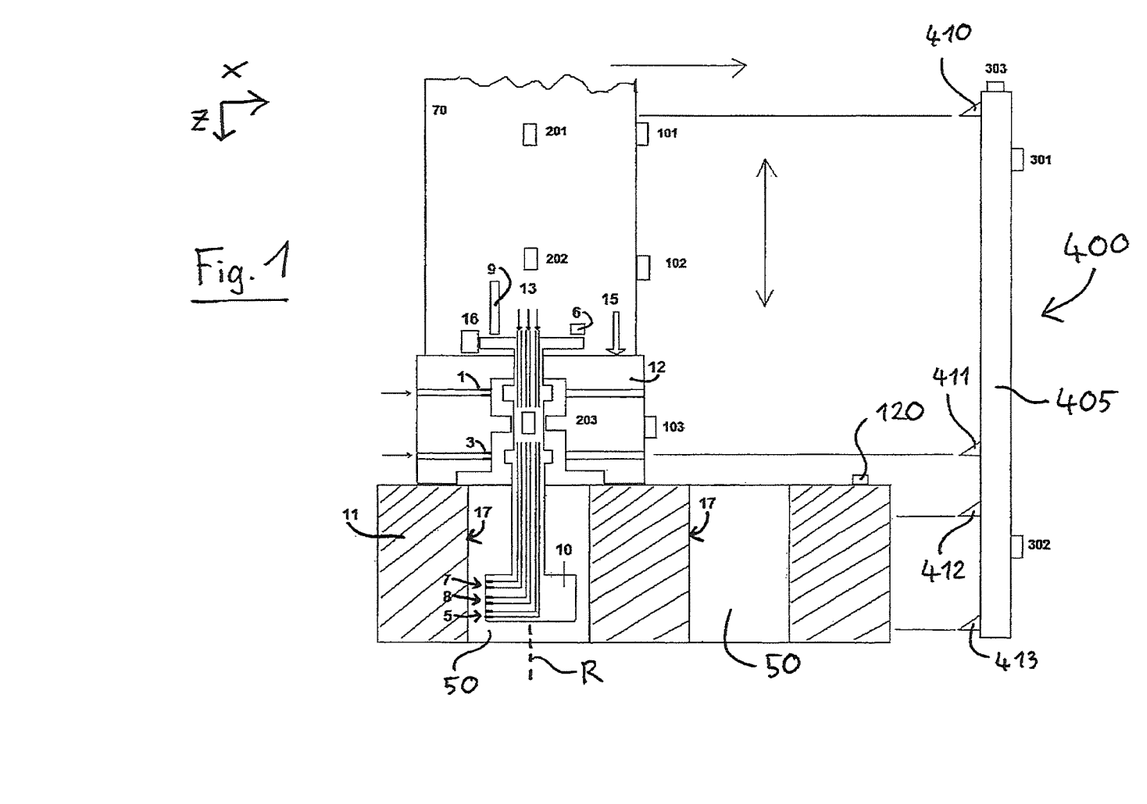
FIG. 1 is a lateral sectional view of an apparatus in accordance with the invention for measuring bores.
Figure 2:
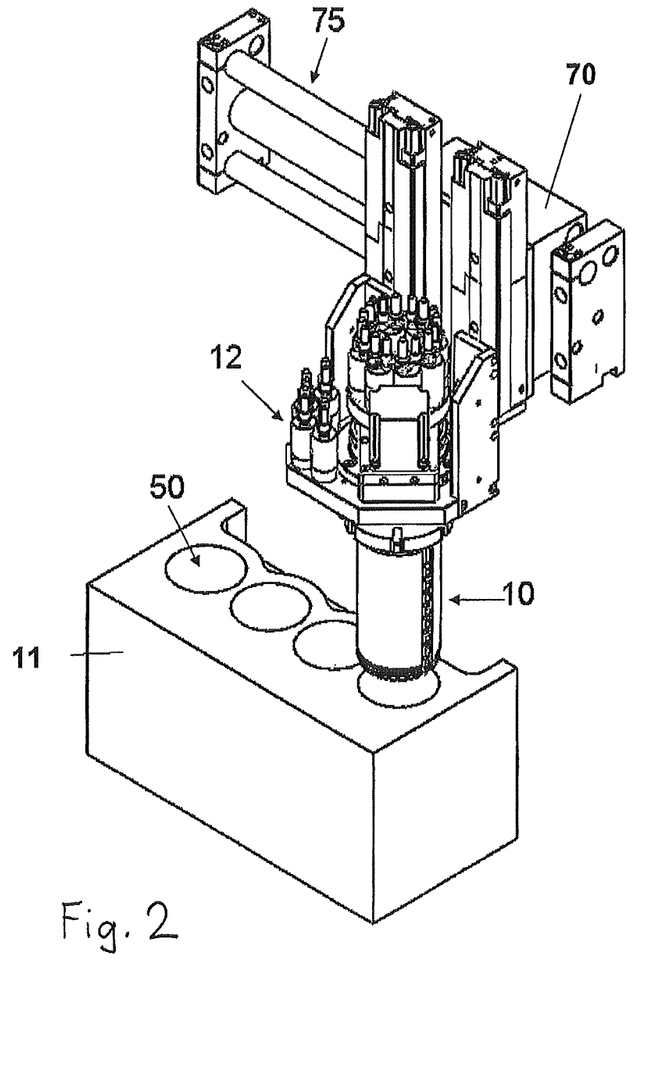
FIG. 2 is a perspective view of the apparatus in accordance with FIG. 1.

The measuring apparatus shown in FIG. 1 comprises a rod-shaped, sectionally cylindrical measuring probe 10 which is supported rotatably and preferably with a variable tilt at a holder 12 of ring shape here. The holder 12 is fastened to a carrier 70 which is associated with a linear guide 75 of a 3D portal shown more exactly in FIG. 2.

The axis of rotation R about which the measuring probe 10 is rotatable relative to the holder 12 preferably coincides with the longitudinal central axis of the measuring probe 10. Three distance sensors 5, 7, 8 at the side of the measuring probe are provided at the measuring probe 10 and are each configured to detect the instantaneous distance between the measuring probe 10 and a wall 17 of the measurement object 11 to be measured in a radial direction with respect to the axis of rotation R. The distance sensors 5, 7 and 8 are here configured as pneumatic measuring nozzles which can be acted on by compressed air through passages. The distance sensors 5, 7 and 8 are furthermore each fixedly connected to the measuring probe 10. The instantaneous angle of rotation of the measuring probe 10 with respect to the axis of rotation R can be determined by means of an angle of rotation sensor 6. When necessary, more than three distance sensors 5, 7, 8 can also be provided at the measuring probe 10. In addition, the distance sensors 5, 7, 8 at the measuring probe side can have not only a vertical offset, but also an angular offset about the axis of rotation R.

A measuring plane is so-to-say defined by the vertical position of a distance sensor 5, 7, 8. Depending on the application requirement, a measuring apparatus in accordance with the invention can have twenty measuring planes and more. The arrangement of the measuring planes along the axis of rotation R does not necessarily have to be equidistant in this respect. The number of measuring planes in a specific section of the measuring probe 10 can rather depend on the deformation of the measurement object 11 to be expected in this section. If appreciable deformations are hardly to be expected in a specific section, it is favorable for cost reasons only to provide a few measuring planes here. In contrast, as many measuring planes as possible should be provided in a section in which greater deformations are to be expected. The simultaneous measurement in a plurality of measuring planes allows a substantially faster measurement of a measurement object 11 than is, for example, possible by means of a probe sphere to be moved individually.

Furthermore, two distance sensors 1, 3 at the holder side are provided by means of which the current position and/or the current tilt of the measuring probe 10 can be determined relative to the measurement object 11. For this purpose, the distance sensors 1, 3 at the holder side, which are here likewise designed as pneumatic measuring nozzles, are fixedly connected to the holder 12. Two further distance sensors at the holder side, not visible in FIG. 1, are preferably provided and are spaced apart from the axis of rotation R in a plane extending at a right angle to the paper plane. In other respects, the measuring probe 10 and the holder 12 can be designed as disclosed in DE 10 2010 014 817 A1.

To carry out a measurement, the measuring probe 10 is rotated completely at least once, i.e. by 360°, about the axis of rotation R, with the distance sensors 5, 7, 8 at the measuring probe side detecting the distances between the measuring probe 10 and the wall 17 continuously or in repeated single steps during the rotation and the angle of rotation sensor 6 detecting the respective associated rotational positions of the measuring probe 10. A multiple complete rotation of the measuring probe 10 about the axis of rotation R can be carried out as required to increase the measurement accuracy and in particular to suppress noise.

If the position and the tilt of the measuring probe 10 relative to the holder 12 does not change during the rotation, the shape extent of the bore 50 can be determined based on the distance values determined by the distance sensors 5, 7, 8 and on the angle of rotation values associated with them and determined by the angle of rotation sensor 6.

If the position and/or the tilt of the measuring probe 10 relative to the holder 12 changes during the rotation, an evaluation device, not shown in the Figures, provides that the distance values determined by the distance sensors 5, 7, 8 at the measuring probe side are corrected using the distance values determined by the distance sensors 1, 3 at the holder side. Any wobble movements of the measuring probe 10 can in particular be compensated in this manner. The measuring probe 10 is vertically adjustable relative to the holder 12 by means of a powered linear carriage 9. The measuring probe 10 can thus be positioned by means of the linear carriage 9 at any desired height relative to the measurement object 11, i.e. at any desired depth of the bore 50 in order thus to measure the bore three-dimensionally.

To determine changes of the position of the holder 12 relative to the measurement object 11 which occur during the measurement, four acceleration sensors 101, 102, 201, 202 are attached to the carrier 70. While the two acceleration sensors 101, 102 located at the right in the drawing detect accelerations of the carrier 70 in the x direction, the two acceleration sensors 201, 202 located at the right in the drawing serve to detect accelerations of the carrier 70 in the y direction projecting from the paper plane. In general, at least one acceleration sensor acting in the z direction could also be provided, but this is not shown in FIG. 1. To increase the reliability of the measurement by redundancy, corresponding acceleration sensors 103, 203 are also attached to the holder 12—a respective one in the x direction and one in the y direction. Since the center of rotation of a possible tilt change of the carrier 70 or of the holder 12 in space is generally not known, it is preferred to provide at least two mutually spaced apart acceleration sensors both in the x direction and in the y direction. In principle, one or more three-dimensional acceleration sensors could also be provided. An acceleration sensor 120 which is attached to the measurement object 11 and which is preferably designed as a 3D sensor determines positional changes of the measurement object 11 and serves for a further increase of the measurement accuracy. The acceleration sensor 120 at the measurement object side can be fastened to the measurement object 11 by means of a vacuum suction device, for example.

The evaluation device is able to integrate the acceleration values determined by the acceleration sensors 101 102, 103, 120, 201, 202, 203 twice in each case and to determine respective integration constants. The first integration in this respect produces a speed value, while the second integration produces a value for the path covered. Any positional changes of the carrier 70 or of the holder 12 fixed to it relative to the measurement object 11 can thus be determined in the course of a measurement by the shown arrangement of acceleration sensors 101, 102, 103, 120, 201, 202, 203 and can be used for the compensation of measurement errors in the determination of the shape extent.

It must be pointed out that changes in the position of the holder 12 relative to the measurement object 11 extending in the z direction influence the measured values substantially less than radial positional changes, that is e.g. displacements of the holder 12 in the x direction. This in particular applies in the case of pneumatic measuring nozzles since they do not measure point-wise like a sensing body, but rather averaged over a larger measurement region. Accordingly, the resolution of the acceleration sensors 101, 102, 103, 120, 201, 202, 203 in the different directions is also of different importance and can accordingly be selected differently. Under certain circumstances, no correction at all has to be carried out in the z direction so that no sensor is required for the z direction.

The positioning determination device 400 located at the right next to the carrier 70 in the drawing can serve for the additional separate determination of the positional change of the carrier 70 or of the holder 12 relative to the measurement object 11. The position determination device 400 can, however, in principle also be provided instead of the acceleration sensors 101, 102, 103, 120, 201, 202, 203 for determining such positional changes. The position determination device 400 comprises a rod 405 which is vertical here and which is fixedly mounted in the higher ranking test device comprising the measuring apparatus, for example at a basic framework or at a basic frame. Tilt sensors 301, 302, 303 are attached to the rod 405 and the tilt of the rod 405 and in particular tilt changes of the rod 405 can be determined by means of them.

Furthermore, four distance sensors 410 to 413 are attached to the rod 405 which are configured to detect the distance of the rod 405 from the carrier 70, from the holder 12 or from the measurement object 11. The distance sensors 410 to 413 work in the embodiment shown with laser radiation such as is illustrated by the horizontal lines. More than four distance sensors can also be provided.

A further rod of the position determination device 400 not visible in FIG. 1 is arranged spaced apart from the carrier 70 in the y direction and is likewise provided with three tilt sensors and four distance sensors. It is preferred that at least two tilt sensors and/or at least two distance sensors are respectively provided per rod. The evaluation device is able to determine any positional changes of the carrier 70 and/or of the holder 12 relative to the measurement object 11 from the tilt values of the tilt sensors attached to the rods and from the distance values of the distance sensors attached to the rods and to take them into account accordingly in the determination of the shape accuracy of the bore 50.

Figure 3:
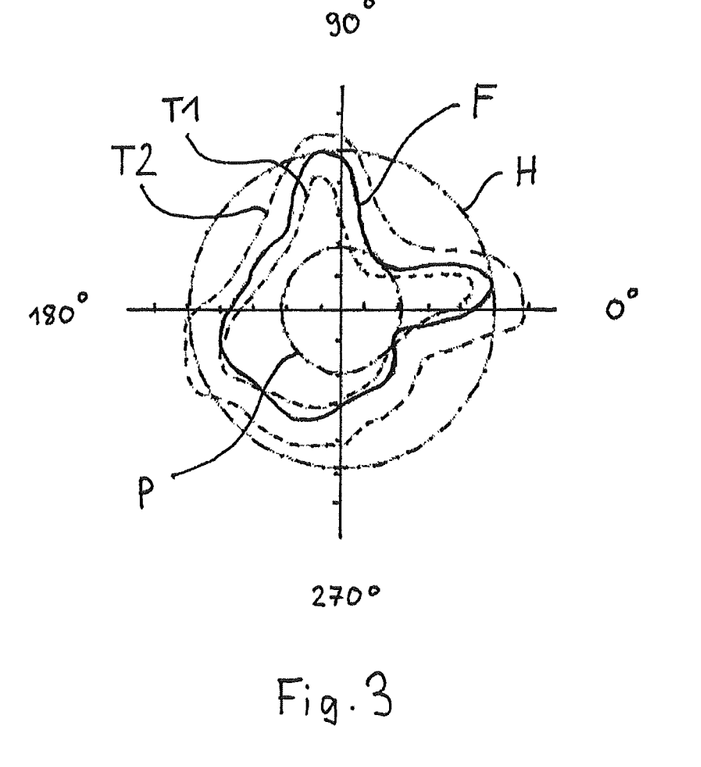
FIG. 3 shows a shape extent of a bore determined by means of the apparatus in accordance with FIG. 1 together with a predefined tolerance region as well as with a minimum circumscribed circle and a maximum inscribed circle.

FIG. 3 shows the shape extent F of a pronouncedly non-round bore in a predefined measurement plane. The shape extent F determined by means of one of the distance sensors 5, 7, 8 is shown as a solid line. The region bounded by the dashed lines T1, T2 marks a predefined tolerance region for the shape extent F. In the example shown, the bore does not satisfy the predefined demands as can be recognized in the lower quadrants of the diagram. The minimum circumscribed circle H and the maximum inscribed circle P for the shape extent F are shown in FIG. 3, in each case in chain-dotted lines. It can be recognized that in the example shown the determination of the minimum circumscribed circle H and of the maximum inscribed circle P is alone not sufficient to appropriately characterize the quality of the bore.

Figure 4:
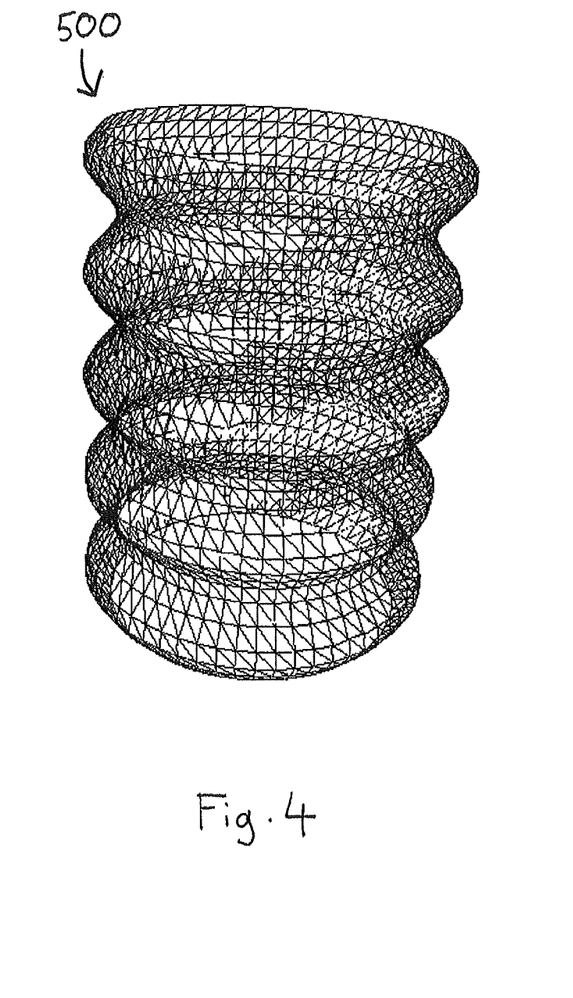
FIG. 4 shows a three-dimensional shape extent of a bore determined by means of the apparatus in accordance with FIG. 1 in the form of a grid.

To visualize the three-dimensional shape extent of the bore 50, the measurement can be carried out in a plurality of measurement planes distributed over the depth of the bore 50 and a grid can be prepared using the set of planar shape extents. Such a grid 500 is shown in FIG. 4. It is possible to visualize by different coloring the regions in which the measured shape is within the tolerance region and where the measured values are too large or too small.

Figure 5:
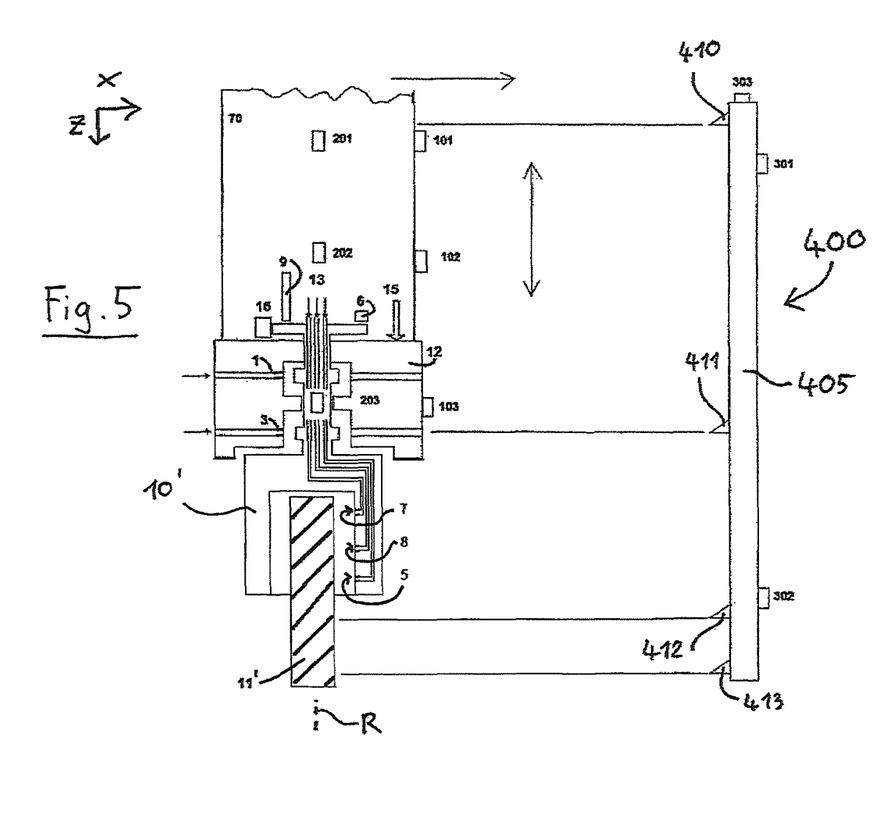
FIG. 5 is a lateral sectional view of an apparatus in accordance with the invention for measuring spindles or shafts.

In the alternative embodiment of the invention shown in FIG. 5, the measuring probe 10' is designed as a measurement ring, with the distance sensors 5, 7, 8 at the measuring probe side being directed into the interior of the measurement ring. Such a measuring probe 10' in particular allows the measurement of the external dimensions of a spindle-like measurement object 11'. Apart from the design of the measuring probe 10', the measuring apparatus shown in FIG. 5 can equally be configured as described above with reference to FIG. 1.

The invention overall makes possible a robust, fast and exact measurement of the shape extent of measurement objects of any desired shape. Specifically, it is possible to measure in an advantageous manner bores having a non-cylindrical warp geometry during shape honing or spindles having a complex shape extent during grinding. The measurement apparatus in accordance with the invention can be integrated in a simple manner into a production machine. The possibility provided by the invention of carrying out bore inspections on site without having to take the workpiece into a laboratory or even into a clean room is of particular advantage.

REFERENCE NUMERAL LIST 1, 3 distance sensor at the holder side
5 distance sensor at the measurement probe side
6 angle of rotation sensor
7 distance sensor at the measurement probe side
8 distance sensor at the measurement probe side
9 linear guide
10, 10' measuring probe
11, 11' measurement object
12 holder
17 wall
50 bore
70 carrier
75 linear guide
101, 102, 103 acceleration sensor detecting in the x direction
120 acceleration sensor attached to the measurement object
201, 202, 203 acceleration sensor detecting in the y direction
301, 302, 303 tilt sensor
400 position determination device
405 rod
410-413 distance sensor
500 grid
R axis of rotation
F shape extent
T1, T2 tolerance region
H minimum circumscribed circle
P maximum inscribed circle

The invention claimed is:

1. An apparatus for the industrial measurement of measurement objects, comprising a measuring probe which can be led up to the measurement object and at which at least one distance sensor is provided with which the instantaneous distance of a reference point of the measuring probe from a wall of the measurement object can be determined, wherein the measuring probe is rotatably supported at a holder which is fixed with respect to the measurement object and/or whose position relative to the measurement object is known; and comprising an evaluation device which is configured to receive at least one distance value determined by the distance sensor as part of a measurement and to associate it with a rotary position of the measuring probe,
further comprising means for determining a change in the relative position between the holder and the measurement object occurring during the measurement, compromising at least one carrier element separate from the holder and in a fixed position with respect to the measurement object, with at least one tilt sensor being attached to the carrier element for determining a tilt of the carrier element and with at least one distance sensor being attached to the carrier element for detective a distance of the carrier element from the holder, from a carrier component connected thereto in a fixed position and/or from the measurement object.

2. The apparatus in accordance with claim 1,
wherein the evaluation device is configured to carry out a correction of the measurement with reference to the determined change in the relative position between the holder and the measurement object.

3. The apparatus in accordance with claim 2,
wherein the carrying out of the correction comprises a compensation of movements of the holder and/or of the measurement object.

4. The apparatus in accordance with claim 1,
wherein the means for determining a change in the relative position between the holder and the measurement object occurring during the measurement comprise at least one acceleration sensor attached to the holder or to a carrier component connected thereto in a fixed position.

5. The apparatus in accordance with claim 4, wherein at least one pair of acceleration sensors is provided at the holder or at the carrier component, said pair comprising two acceleration sensors arranged in a common plane and offset from one another with respect to a rotational axis of the measuring probe by an angle of rotation.

6. The apparatus in accordance with claim 5, wherein the angle of rotation is 90°.

7. The apparatus in accordance with claim 4, wherein the or each acceleration sensor is configured and arranged for detecting the acceleration of the holder or of the carrier component in a radial direction with respect to the axis of rotation.

8. The apparatus in accordance with claim 4, wherein the or each acceleration sensor is configured as a three-dimensional sensor.

9. The apparatus in accordance with claim 4, wherein the evaluation device is configured to integrate an acceleration value received by the acceleration sensor twice and optionally to determine respective integration constants.

10. The apparatus in accordance with claim 1, wherein the means for determining a change in the relative position between the holder and the measurement object occurring during the measurement comprise at least one acceleration sensor attached to the measurement object.

11. The apparatus in accordance with claim 1, wherein the at least one carrier element is a rod.

12. The apparatus in accordance with claim 1, wherein at least two tilt sensors arranged spaced apart from one another and/or at least two distance sensors arranged spaced apart from one another are attached to the carrier element.

13. The apparatus in accordance with claim 1, wherein at least three tilt sensors arranged spaced apart from one another and/or at least at least three distance sensors arranged spaced apart from one another are attached to the carrier element.

14. The apparatus in accordance with claim 1 wherein at least one further carrier element is provided having at least one tilt sensor and at least one distance sensor, said carrier element being arranged offset by an angle of rotation from the other carrier element with respect to an axis of rotation of the measuring probe.

15. The apparatus in accordance with claim 14, wherein said carrier element is arranged offset by an angle of rotation of 90°.

16. The apparatus in accordance with claim 1, wherein the evaluation device is configured to receive a set of consecutively determined distance values or distance data in the course of a rotation of the measuring probe.

17. A method for industrial measurement with the apparatus of claim 1, comprising leading the measuring probe up to a measurement object, instantaneously determining the distance of a reference point of the measuring probe from a wall of the measurement object by means of at the least one distance sensor, determining at least one distance value with the at least one distance sensor associated with a rotary position of the measuring probe as part of the measurement, and determining changes in the relative position between the holder and the measurement object occurring during the measurement.

18. The method in accordance with claim 17, wherein a correction of the measurement is carried out with reference to the determined change in the relative position between the holder and the measurement object.

19. The method in accordance with claim 17, wherein movements of the holder and/or of the measurement object are compensated for carrying out the correction.

* * * * *